July 2, 1957 — D. J. BLOOMBERG ET AL — 2,797,618
PHOTOGRAPHIC CAMERA LENS SYSTEM ADJUSTING MECHANISM
Filed Dec. 19, 1955 — 3 Sheets-Sheet 1

DANIEL J. BLOOMBERG
JOHN E. POND
INVENTORS

ATTORNEYS

July 2, 1957 D. J. BLOOMBERG ET AL 2,797,618
PHOTOGRAPHIC CAMERA LENS SYSTEM ADJUSTING MECHANISM
Filed Dec. 19, 1955 3 Sheets-Sheet 2

DANIEL J. BLOOMBERG
JOHN E. POND
INVENTORS

ATTORNEYS

July 2, 1957     D. J. BLOOMBERG ET AL     2,797,618
PHOTOGRAPHIC CAMERA LENS SYSTEM ADJUSTING MECHANISM
Filed Dec. 19, 1955     3 Sheets-Sheet 3

DANIEL J. BLOOMBERG
JOHN E. POND
INVENTORS

ATTORNEYS

United States Patent Office 2,797,618
Patented July 2, 1957

1

2,797,618

PHOTOGRAPHIC CAMERA LENS SYSTEM ADJUSTING MECHANISM

Daniel J. Bloomberg, Encino, and John E. Pond, North Hollywood, Calif., assignors to Republic Productions, Inc., a corporation of New York Application December 19, 1955, Serial No. 553,967

14 Claims. (Cl. 88—57)

This invention relates to a photographic lens system, and particularly to an anamorphotic lens attachment for standard motion picture cameras and the adjusting mechanism therefor.

In the art of motion picture production, it has been found desirable to compress the scene being photographed in a horizontal direction and to reversibly expand the scene in this direction upon projection to a wide screen.

Many types of optical systems for accomplishing this purpose have been designed, these prior systems using intricate and complex optical units for compressing the image during the photographing of the scenes. The present invention is directed to an anamorphotic lens adjunct or attachment to a standard motion picture camera which permits the scene being photographed to be compressed to the desired aspect ratio. The attachment permits the adjustment of the anamorphotic optical unit to a fixed vertical, horizontal, and axial position, depending upon the optical axis and focal length of the standard camera lens, and then to variably adjust the focus of the combination of the anamorphotic lens unit and the standard camera lens unit to the distance of the scene to be photographed. The latter adjusting mechanism includes a rack and pinion for moving the anamorphotic lens to adjust the focus thereof, together with various cams, each of which is suitable for a lens unit of a certain focal length. Backlash has been avoided by the use of a mechanical combination of rotary cam and linear rack which may be adjusted to its driven gear. With the anamorphotic unit removed, the standard camera will function in its normal manner.

The principal object of the invention, therefore, is to facilitate the photographing of compressed images on motion picture film.

Another object of the invention is to provide an attachment or adjunct to a standard motion picture camera for producing compressed images on motion picture film.

A further object of the invention is to provide an anamorphotic lens and standard lens combination for improving the photographing of compressed image and the adjusting mechanism therefor.

A still further object of the invention is to provide an improved adjusting mechanism for an anamorphotic lens attachment combined with a standard motion picture camera.

The novel features which are believed to be characteristic of this invention, both as to the manner of its organization and the mode of its operation, will be better understood from the following description when read in conjunction with the accompanying drawings, in which.

2

Figure 1:
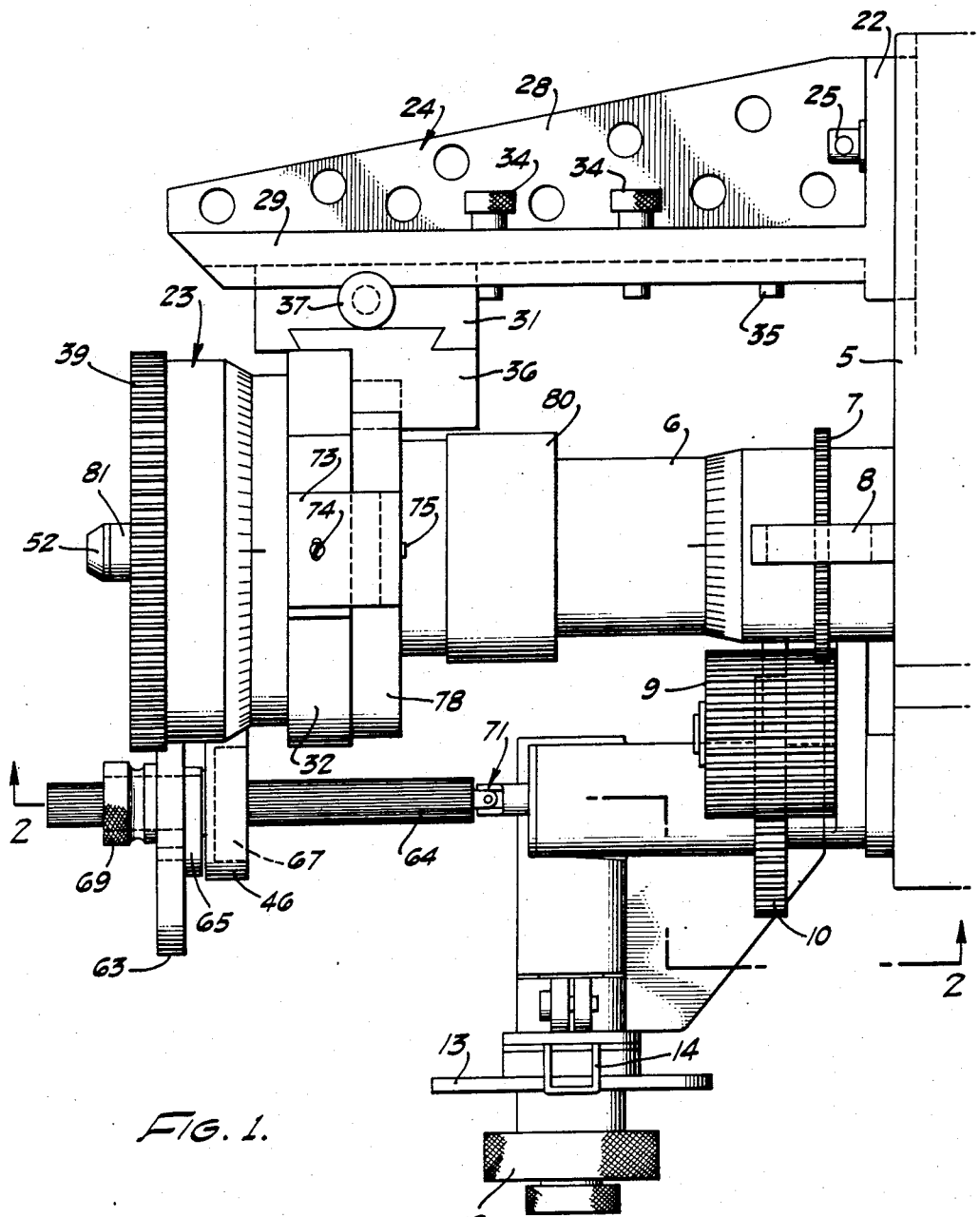
Fig. 1 is a plan view of the front end of a standard commercial motion picture camera with an anamorphotic lens attachment in position.
Figure 2:
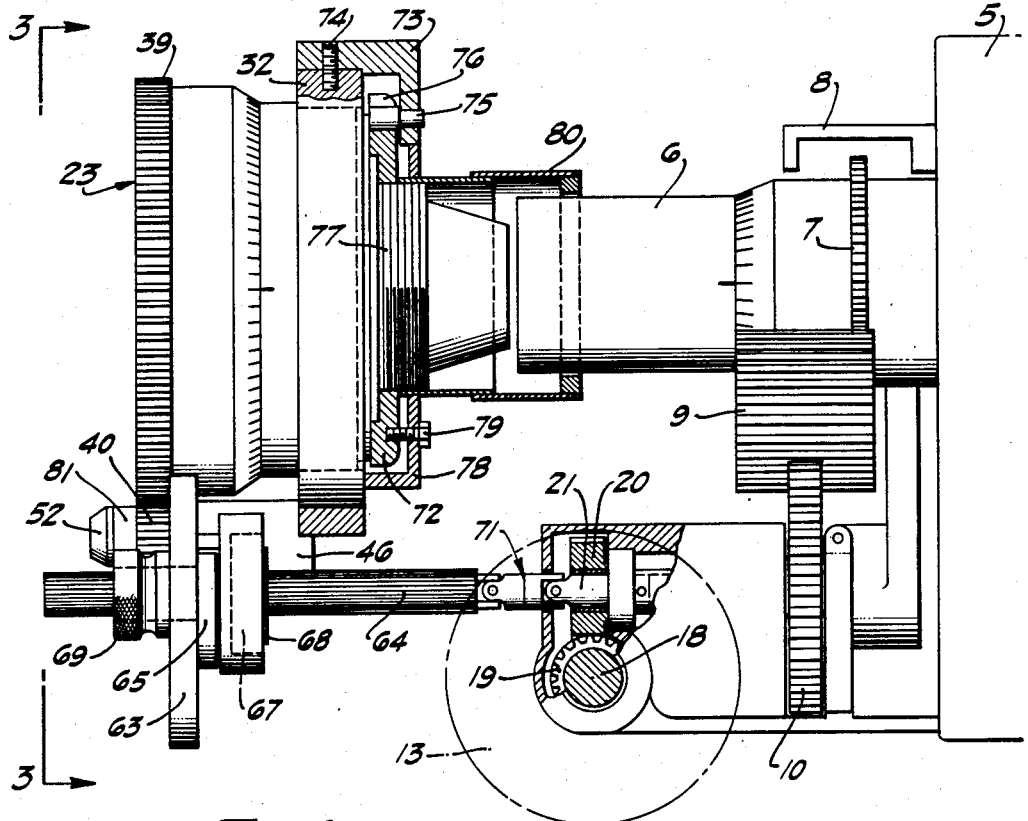
Fig. 2 is a cross-sectional view taken along the line 2—2 of Fig. 1.
Figure 5:
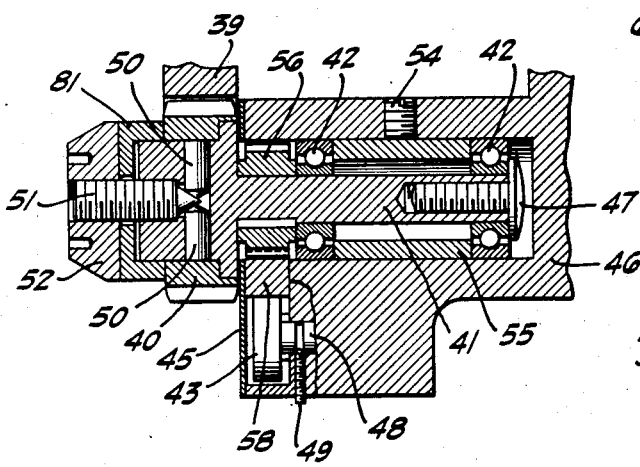
Figure 3:
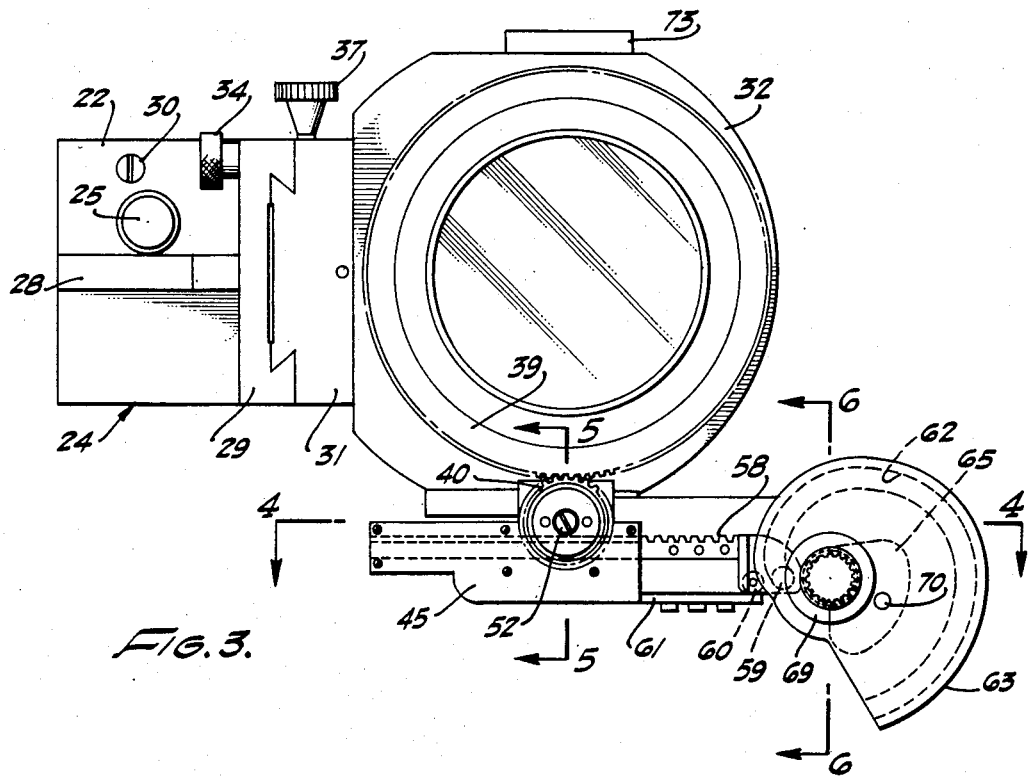
Fig. 3 is an end view of the anamorphotic lens attachment taken along the line 3—3 of Fig. 2.
Figure 4:
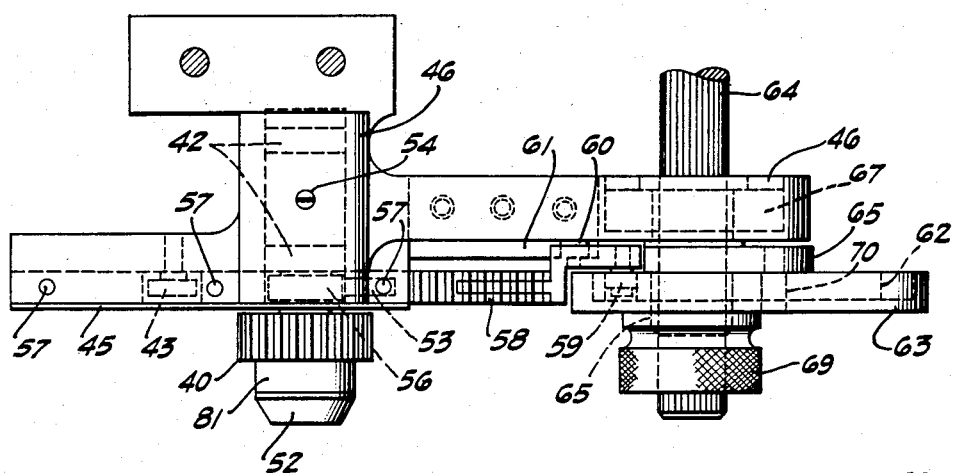

Fig. 4 is a detail view taken along the line 4—4 of Fig. 3;

Fig. 5 is a detail view taken along the line 5—5 of Fig. 3; and

Figure 6:
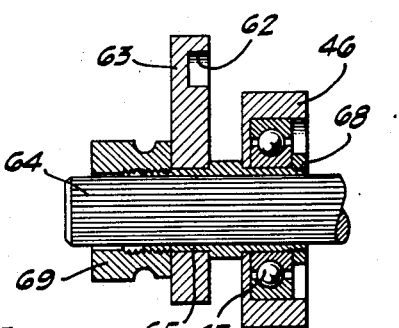

Fig. 6 is a detail view taken along the line 6—6 of Fig. 3.

Referring now to the drawings in which the same reference numerals identify the same elements, the end of a standard motion picture camera 5 is shown with an optical unit 6 having a ring gear 7 for adjusting the focus thereof. The ring gear 7 is in mesh with a wide intermediate gear 9, which, in turn, is in mesh with a drive gear 10. The gear 9 is wide to permit gear 7 to move axially along the surface thereof during the focusing adjustment. The gear 10 is rotated by a knurled hand wheel 12 having an indicia disc 13 and a pointer support 14. The shaft 18, rotated by the wheel 12, has a gear 19 thereon in mesh with a gear 20 on a shaft 21. The drive gear 10 is mounted on the shaft 21 and rotated thereby. Thus, to focus the lens unit 6, the wheel 12 is rotated, which moves the lens unit 6 axially to focus upon any particular scene. A safety stop 8 protects against overtravel of lens unit 6. The equipment just described is the focusing mechanism for camera 5 when used alone.

To support the anamorphotic lens unit shown generally at 23 is a web bracket shown generally at 24, and which is attached to the camera 5. The bracket 24 is horizontally adjustable on standard dovetail ways on its base 22 by an eccentric 25, after which it is locked by a screw 30. The bracket 24 has a web 28 and a face plate 29 in which are dovetail ways for mounting a horizontally slidable block 31. This permits the anamorphotic lens unit 23 to be moved axially to positions determined by spring biased pins 34 and a stop pin 35, depending upon the focal length of the standard camera lens unit 6 being used at any particular time. The block 31 has vertical dovetail ways for vertically adjusting a mounting ring 32 which is integral with a dovetailed boss 36 in the ways of block 31. The ring 32 supports the anamorphotic lens unit 23. The vertical adjustment is made with a screw 37.

Thus, to align the optical axis of the unit 23 with respect to a particular lens unit 6 of a standard commercial camera, the bracket 24 is moved horizontally on the ways in base plate 22 attached to the camera and vertical by ring boss 36 in the ways of block 31. To adjust the axial position of the unit 23 with respect to a certain lens unit 6, the block 31 is moved horizontally in the ways of face plate 29.

Since the anamorphotic lens of unit 23 compresses the image more horizontally than vertically, it must be properly oriented with respect to a horizontal axis. This adjustment is provided by a nut 72 threaded on the threaded portion 77 of unit 23, key bracket 73 attached to mounting ring 32 by a screw 74, and key 75 positioned in the key bracket 73 and a notch 76 in nut 72. Screw 74 is in an elongated slot in bracket 73 for rotating the lens within the limits of the slot. A locking ring 78 is attached to nut 72 by screws such as shown at 79 to hold the anamorphotic lens securely within its mounting ring 32. A telescoping sunshade is shown at 80.

The horizontal, vertical, and rotational adjustments just described normally remain fixed after once made. The axial adjustment is made whenever the camera lens unit 6 is changed.

The focusing mechanism for any particular scene will now be described. The unit 23 has a ring gear 39 which is in mesh with a pinion gear 40 mounted on a shaft 41 rotatable on bearings 42. The shaft 41 is held in position by a sleeve 55 held by a set screw 54 through its housing 46, which is attached to the lens supporting ring 32. A large screw 47 axially positions the shaft 41 in one direction. Also on shaft 41 is a gear 56 which has a pitch diameter one-half that of gear 40 to provide the necessary relationship between the angle of rotation of a driving cam 63, movement of rack 58, and rotation of gear 39. The rack 58 is in mesh with gear 56, the rack being adjusted to the diametrical pitch of gear 56 by the pressure of ball bearings 43 and 53 ecentrically mounted on shafts such as shown at 48, held in any adjusted position by a set screw 49. The two bearings are provided on each side of gear 56. A dustproof plate 45 seals the bearings 42, gear 56, and rack 58. As shown in Fig. 4 by screws 57, pressure is applied through a plate to the ends of the teeth of rack 58 to maintain it in proper alignment with gear 56 and the operating center of cam 63 and cam follower 59 in groove 62 of the cam.

To maintain the cam follower end of rack 58 in alignment during rotation of the cam, a ball bearing 60, mounted on the end of the rack, rides on a plate 61. The cam 63 is mounted on a spline nut 65 which is rotatable in a bearing 67 held in housing 46 and driven by a spline 64. The assembly is held together by a lock nut 68, while the cam 63 is positioned with respect to spline nut 65 by a pin 70 which is so located that the root diameter of the groove 62, to provide the infinite focusing position, is always at the proper point. A nut 69 holds the cam 63 on the spline nut 65. This assembly permits cams with different shaped grooves to be readily interchanged when different lens combinations are used. The spline permits axial movement of the focusing mechanism when different lens combinations are used. The spline 64 is connected to shaft 21 by a double universal joint 71.

As mentioned above, the anamorphotic lens unit 23 is rotatable for orientation and shifted axially without rotation during focusing. To adjust the rack position with respect to the cam groove and gear 39 after the orientation adjustment, the mechanism to the left in Fig. 5 is provided. This unit is a friction connection between the shaft 41 and gear 40. The shaft 41 has two diametrically opposite radial holes in which are pins 50 movable axially in the holes by a pointed set screw 51 threaded in the end of shaft 41. Thus, the gear 40 can be released from shaft 41 during the rotation of the lens unit 23 which permits the rack to remain in its proper position. After the lens is oriented, the screw 51 is turned to bring the ends of the pins 50 into pressure contact with the gear 40. To lock screw 51, a nut 52 is threaded on the screw and bears against a cup washer 81, which, in turn, bears against the gear 40.

The special cam and rack combination provides reversible action within the limits of rotation of the cam, each cam varying in accordance with the lens being used on the standard camera. Each cam groove must permit the anamorphotic lens to be focused between infinity and approximately five feet for each lens unit used on the standard camera, which are adjustable over different distances within the same limits, depending on their focal lengths. Since accuracy of adjustment of the focus of the lens components in compressed image photography is critical in the production of good quality images, the above-described initial and varying adjustments have been provided. The focusing adjustments of both lens units are under control of a single hand wheel 12, while the mechanism can be quickly changed to accommodate different lens combinations.

We claim:

1. A photographic lens adjusting mechanism comprising a lens unit adapted to be attached to a camera having a lens, means for fixedly adjusting the optical axis of said lens unit to a predetermined position with respect to said camera lens, and means for variably adjusting said lens unit along its optical axis with respect to said camera lens, said last mentioned means including a ring gear on said lens unit, a pinion drive gear in mesh with said lens unit ring gear, a rack for rotating said pinion drive gear, a cam having a spiral groove therein of a predetermined shape, the bottom of said groove being in a plane, a connection between the end of said rack and said cam, and means for rotating said cam for rotating said lens unit ring gear to variably adjust said lens unit along its optical axis.

2. A photographic lens adjusting mechanism in accordance with claim 1 in which said first mentioned means includes a bracket having dovetail ways on said camera for adjusting the optical axis of said lens unit in one direction perpendicular to said axis, and a block intermediate said bracket and said lens unit for adjusting the optical axis of said lens unit in another direction perpendicular to said first mentioned adjustment and to said optical axis.

3. A photographic camera system comprising a first lens unit, a gear train for rotating said first lens unit for adjusting the focus thereof, a drive shaft for rotating said gear train, a second lens unit, means for adjusting the optical axis of said second gear unit to coincide with the optical axis of said first lens unit, and means for adjusting the focus of said second lens unit simultaneously with the adjustment of the focus of said first lens unit, said means including a gear on said second lens unit, a gear train including a pair of gears, one of said pair of gears being in mesh with said second lens unit gear, a common shaft for said pair of gears, a rack in mesh with the other of said pair of gears, a cam mounted on said first mentioned gear train shaft, and means for connecting said cam to said rack for rotation of said second lens gear with the rotation of said first mentioned gear train for said first lens unit.

4. A photographic camera system in accordance with claim 3 in which said cam has a groove therein and said rack has a bearing member mounted in said groove, a portion of said drive shaft being splined to permit movement of said focus adjusting means for said second lens unit parallel with the optical axis of said lens units.

5. A photographic camera system in accordance with claim 4 in which means are provided in contact with said rack for maintaining said rack in a predetermined path of movement during rotation of said cam.

6. A photographic camera system in accordance with claim 3 in which means are provided for attaching and detaching said first mentioned one of said pair of gears for said second lens unit from said common shaft to permit rotation of said gear on said second lens when said rack is stationary.

7. A lens unit attachment for a standard motion picture camera having a certain standard lens unit to provide contracted images, said attachment comprising an anamorphotic lens unit, means for mounting said lens unit to said camera, said means including means for fixedly adjusting the optical axis of said anamorphotic lens unit to coincide with the axis of said camera lens unit, means for fixedly adjusting said anamorphotic lens unit to a definite position along its optical axis in accordance with the particular standard lens unit, means for variably adjusting the focus of said camera lens unit, said means including a rotatable shaft, an extension for said shaft, and focus adjusting mechanism for said anamorphotic lens unit mounted on and rotatable by said extension of said shaft, said mechanism including a cam having a groove therein of a shape depending on the particular lens unit of said camera, a rack movable rectilinearly by said cam, a gear rotatable by said rack, and a gear on said anamorphotic lens unit in mesh with a gear rotated by movement of said rack.

8. A lens unit attachment in accordance with claim 7 in which a gear is provided in mesh with said rack and a common shaft is provided for said gear in mesh with said rack and said gear in mesh with said lens gear, and means being provided for connecting and disconnecting said gear in mesh with said lens unit gear to and from said common shaft.

9. A lens unit attachment in accordance with claim 7 in which are provided a connecting means between said cam and said rack, said means including a bearing mounted in a groove in said cam, means being provided to adjust the path of said rack with respect to the gear in mesh therewith and said groove in said cam.

10. A lens unit attachment in accordance with claim 7 in which said mounting means for said anamorphotic lens unit includes means for adjusting the fixed rotational position of the lens in said unit, said focus adjusting mechanism transporting said lens along its optical axis.

11. A lens unit attachment in accordance with claim 8 in which said connecting and disconnecting means are pins in radial openings in said common shaft adapted to bear against said gear in mesh with said lens gear, threaded means being provided in said common shaft to move said pins in said openings.

12. A lens unit attachment in accordance with claim 7 in which said mounting and fixedly adjusting means for said anamorphotic lens unit includes a bracket adjustable in one direction on said camera and a holder for said anamorphotic lens unit adjustable on said bracket at right angles to the direction of adjustment of said bracket on said camera and along the optical axis of said lens units.

13. A lens unit attachment for a standard motion picture camera, said camera being adapted to use lens units of different focal lengths, said lens unit attachment and said camera lens units providing contracted images, comprising an anamorphotic lens unit, means for mounting said anamorphotic lens unit to said camera, said means including means for fixedly adjusting the optical axis of said anamorphotic lens unit to coincide with the optical axis of any one of said lens units of said camera, means for fixedly adjusting said anamorphotic lens unit to a definite position along its optical axis in accordance with the focal length of any particular lens unit of said camera, means for variably adjusting the focus of said camera lens unit, said means including a rotatable shaft, and a focus adjusting mechanism for said anamorphotic lens unit rotatable by said shaft, said mechanism including a cam having a groove therein of a shape depending on the particular lens unit of said camera, a ring gear on said anamorphotic lens unit, and means for interconnecting said ring gear with said shaft.

14. A lens unit attachment in accordance with claim 13 in which said last-mentioned means includes a pair of interconnected gears and a rack, one of said pair of gears being in mesh with said ring gear of said anamorphotic lens unit and the other of said pair of gears being in mesh with said rack, the end of said rack being connected in said cam groove.

References Cited in the file of this patent
UNITED STATES PATENTS

| | | |
|---|---|---|
| 1,879,737 | Del Riccio | Sept. 27, 1932 |
| 1,947,669 | Warmisham et al. | Feb. 20, 1934 |
| 2,159,394 | Mellor et al. | May 23, 1939 |
| 2,165,341 | Capstaff et al. | July 11, 1939 |
| 2,720,817 | Mills | Oct. 18, 1955 |